United States Patent Office 3,544,656
Patented Dec. 1, 1970

3,544,656
HARD, ELASTIC, AND IMPACT-RESISTANT COATINGS
Karl-Heinz Hornung, Ernst-Christian Schütze, and Rudolf Nehring, Marl, Germany, assignors to Chemische Werke Huls A.G., Marl, Germany
No Drawing. Filed Dec. 8, 1967, Ser. No. 688,968
Claims priority, application Germany, Dec. 10, 1966, C 40,944
Int. Cl. C08g 37/34, 17/13
U.S. Cl. 260—850                                    10 Claims

ABSTRACT OF THE DISCLOSURE

Exceptionally hard, extensible, chemically resistant, and impact resistant coatings based on coating compositions of aminoplasts combined with polyesters, wherein the latter is formed from dicarboxylic acids and carbonate-containing dihydroxy compounds of the formula:

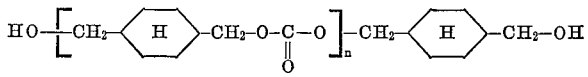

wherein $n$ is an integer of 1 to 15 inclusive.

BACKGROUND OF THE INVENTION

This invention relates to coating compositions comprised of: (A) linear polyesters containing hydroxyl and carboxyl groups; and (B) aminoplasts.

It is known from German Auslegeschrift (published application) 1,015,165 (column 5) that coatings can be produced by curing a mixture of a phthalic acid-fumaric acid propylene glycol polyester, and a butylated melamine-formaldehyde resin. Resulting coatings, however, exhibit a relatively poor chemical resistance. Moreover, it will be shown that mixtures of linear polyesters, on the one hand, and melamine-formaldehyde resins, on the other hand, yield cured coatings which, though being elastic, are dull and soft (see Comparative Examples I and II).

It is also known, from German Auslegeschrift 1,015,-165, that coatings having an extraordinarily high resistance to chemicals can be obtained by combining an alkylated melamine-formaldehyde or urea-formaldehyde condensation product with a linear polyester produced by polyesterification of a dicarboxylic acid with a diol of the general formula:

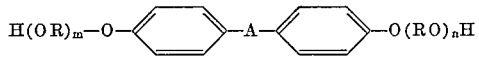

wherein

A represents a 2-alkylidene radical of 3–4 carbon atoms;
R represents an alkylene radical of 2–3 carbon atoms; and
$m$ and $n$ are each at least 1, the sum of $m$ and
$n$ not being larger than 3.

Although the thus produced coatings are hard, they are dull and very brittle (see Comparative Example III).

SUMMARY OF THE INVENTION

An object of this invention is to provide novel coatings wherein high elasticity and impact strength are combined with great hardness.

Another object is to provide novel coating compositions and ingredients for same.

Upon further study of the specification and claims, other objects and advantages of the present invention will become apparent.

To attain the objects of this invention, a carbonate-containing dihydroxy compound of the formula:

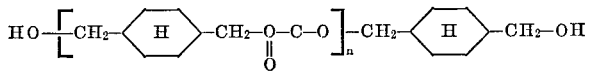

wherein $n$ represents 1 to 15, preferably 1 to 10, is reacted with a dicarboxylic acid, a dicarboxylic acid anhydride, or a dicarboxylic acid di(lower)alkyl ester in a molar ratio of 2:1 to 1.2:1. The resultant polyesters are cured in a conventional manner with aminoplasts or precursors thereof.

Carbonate-containing dihydroxy compounds of the above formula can be obtained by the reaction of 1,4-bis-(hydroxymethyl) - cyclohexane with phosgene. In this connection, 1,4 - bis - (hydroxymethyl) - cyclohexane can be employed in its trans form or in its cis form, or as a mixture of both forms. This process permits the adjustment of $n$, wherein $n$ represents the average degree of polymerization. For more details see Belgian Patent specification No. 693,956 (U.S. patent application Serial No. 610,230, filed Jan. 19, 1967).

Suitable dicarboxylic acids include aromatic and aliphatic dicarboxylic acids, the latter being saturated or unsaturated. It is preferred to employ dicarboxylic acids of 2 to 12 carbon atoms, especially of 4 to 8 carbon atoms. Particularly suitable species include but are not limited to phthalic acid, isophthalic acid, malonic acid, succinic acid, glutaric acid, adipic acid, suberic acid, sebacic acid, decanedicarboxylic acid, hexahydrophthalic acid, maleic acid, fumaric acid, itaconic acid, and tetrahydrophthalic acid. In place of the free dicarboxylic acids, it is also possible to employ the esters thereof with short-chained alkanols, e.g., the dimethyl, diethyl, or dipropyl esters. Insofar as the dicarboxylic acids form anhydrides, these can likewise be employed, e.g., maleic acid anhydride, succinic acid anhydride, glutaric acid anhydride, phthalic acid anhydride, as well as tetra- and hexahydrophthalic acid anhydride. Other functional dicarboxylic acid derivatives can also be used.

In order to conduct the reaction, the mixture of dihydroxy compound and dicarboxylic acid (or functional dicarboxylic acid derivative) is heated to 140–210° C., preferably to 180–200° C., and the water or alkanol which is liberated is continuously distilled off. It is advantageous to accelerate the water or alkanol removal by passing a stream of an inert gas through the reaction mixture. The esterification takes place substantially quantitatively (about 90–99%) and can be controlled in a simple manner by determining the OH— and acid numbers. In general, it is preferred to use polyesters with an average molecular weight of 700 to 5000, especially of 1500 to 3000. These molecular weights are determined by the molar ratio and molecular weights of dihydroxy compound and dicarboxylic acid. Polyesters of each molecular weight can be obtained in a simple manner by a suitable selection of the molecular weights and the molar ratio of the starting products, easily to discern by one skilled in the art.

Suitable aminoplasts include the known reaction products of aldehydes, particularly formaldehyde, with substances carrying several amino or amido groups, e.g., melamine, urea, N,N'-ethylene urea, dicyanodiamide, and benzoguanamine. Particularly suitable are the aminoplasts modified with alcohols, such as the conventional butylated resinoids. In place of these resinous precondensates, it is also possible to employ the etherified, precursors thereof, e.g., hexamethylol melamine. A wide variety of commercially available aminoplasts is available for combination with the linear polyesters employed in accordance with the present invention. For more details regarding the aminoplasts which can be used, reference is made to "Organic Protective Coatings," Von Fischer and Bobaleck, 1953, Reinhold, pages 210–225; "Lackkunstharze" von H. Wagner and H. F. Sarx, Carl Hanser-Verlag, München, 4. edition, 1959, pages 60–74.

For producing the coatings, first carbonate esters and aminoplast are dissolved in a solvent, preferably a conventional varnish solvent, e.g., xylene or butanol, the weight ratio of carbonate ester:aminoplast being about 60:40 to 90:10. The resulting varnish, optionally pigmented to form an enamel, is then applied and baked at 100–200° C. Since the cross-linking reactions occurring during this step are catalytically accelerated by acids, it is preferable to add them to the varnish. Upon the addition of, for example, 0.5% p-toluenesulfonic acid (based on the total amount of binder), the cross-linking reaction takes place sufficiently rapidly at 120–130° C.

The cross-linking is achieved by reaction between the hydroxyl- or carboxyl-groups of the polyester and the N-methylol- or N-methylol-ether-groups of the aminoplast. More informations upon the structures of the cross-linked groups will be found in the literature, e.g. "Lackkunstharze" von H. Wagner and H. F. Sarx, pages 66 and 70; D. H. Solomon and J. J. Hopwood, J. Appl. Polymer Sci. 10, 981 (1966).

Before the curing step at elevated temperatures there is essentially no reaction at room temperature between the two ingredients. At room temperature the storability of the coating compositions, which contain no catalyst, is nearly unlimited, at least several years. After the addition of the acid catalysts the coating compositions may be stored for several months, at least for six months.

The coatings produced in accordance with this invention have a multitude of excellent properties. They are resistant to solvents, such as xylene, gasoline-benzene mixtures esters, and ketones; they also exhibit an excellent resistance against acids and alkalis (see Example 11). In salt spray tests, tropical condition tests, and tests in the weatherometer, the coatings demonstrated a superior ability to withstand the most extreme environments.

An additional beneficial property of the coatings obtained by this invention is the high gloss which is surprisingly maintained even with large pigment contents. In Example 13, it is demonstrated that, at a $TiO_2$:binder ratio of 3:1, there is obtained a gloss of 100% (according to Lange). Even at a pigment:binder ratio of 4:1, there is still obtained a gloss of 98% (according to Lange). This constancy of gloss makes it possible to fully utilize the large pigment capacity of the binder of this invention, and thus to produce particularly high gloss, high covering power enamels.

Finally, the most noteworthy property of the coatings produced in accordance with this invention is the combination of high elasticity and impact strength with great hardness.

The elastic behavior (elongation) of coatings is customarily determined by the Erichsen depression test (according to DIN [German Industrial Standard] 53,156), indicating, as a measure for the elasticity, the depression of the varnished sheet metal in mm. The essential point for this testing method is to have the deformation of the coating take place slowly (advancement:0.2 mm./sec.). In contrast, for an indication of the behavior of coatings upon sudden deformation, a so-called impact depression measurement is employed. This measurement can be conducted, for example, with the impact depression device 226/D of Erichsen, Hemer-Sundwig. In this device, a hemisphere having a radius of 10 mm. is impressed, by a falling weight, into the sheet metal (the non-varnished side facing upwardly). By varying the height of the fall, the depression can be varied. The depression value is stated (in mm.) at which the varnish coating begins to tear. (The values listed in the table were obtained in this manner and instead of "depression," the synonymous term "cupping" is employed in some instances.)

As has been set forth in connection with the description of the state of the art, and as has been confirmed by comparative tests, coatings of linear polyesters and aminoplasts are known which are elastic (and in that case also withstand impact stresses); however, these coatings exhibit a very low hardness (according to DIN 53,157). On the other hand, coatings having a high hardness are known, which are, however, completely non-elastic and cannot withstand any significant impact. Contrary thereto, the coatings obtained according to this invention exhibit a high impact strength and elasticity, as well as also a great hardness (see Table 1).

This spectrum of properties opens a wide field of applications to the coatings of this invention. In addition to the varnishing or enameling of individual parts subjected to high impact stress, the coatings are particularly well suited for materials which are shaped subsequent to the coating step, for example, by punching.

Therefore, the coating compositions of this invention may be used for varnishing or enameling of e.g. automobile bodies, refrigerators, washing-machines etc., also they are suited for coil-coating.

The polycarbonate esters of tthis invention have a low viscosity; the solutions of the polyesters in xylene, having a solid content of 60% have a viscosity range of about 100 to 1000 cp. at 25° C. Therefore, enamels having a high solids content and relatively low viscosity can be produced and applied easily. Thus, enamel described in Example 13, having a total solids contents of 72.7%, exhibits at 20° C., a run through time of 21 seconds in the DIN–4 container which means that it is possible to apply the enamel by spraying without the necessity of dilution. With this enamel, when spraying 1½ so-called transverse passes onto a vertically positioned sheet of metal, dry coating thicknesses of 50–55$\mu$ are obtained, without the occurrence of running.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

All parts and ratios set forth in the examples below are parts by weight.

EXAMPLE 1

Under a purge stream of nitrogen, 1,988 parts (2 mols) of a dihydroxy compound containing carbonate groups and being of the above general formula ($n=5$) are heated with 116 parts (1 mol) of fumaric acid for 6 hours to 180° C. Residual amounts of water of condensation are then removed by applying a vacuum of about 20 torr (mm. Hg). A clear condensate is obtained which is solid at room temperature, and has a molecular weight of about 2,000 and an acid number of about 3. A 40% solution of this product in xylene is mixed with a commercially available 55% solution of a melamine-formaldehyde condensate in a xylene-butanol mixture (1:1) (Maprenal TTX, produced by Cassella), resulting in a ratio of polyester to melamine resin in the binder of 80:20, respectively. To form an enamel, the varnish is pigmented with $TiO_2$ (ratio of binder:pigment=1:0.6), and 0.5% by weight of p-toluenesulfonic acid (based on the binder) is added.

For testing purposes, the resultant enamel is applied to test metal sheets and cured, and then hardness, elasticity, and impact depression of the resulting coatings are measured (see Table 1).

EXAMPLE 2

Under a nitrogen purge stream, 1,988 parts (2 mols) of a carbonate-containing dihydroxy compound of the above general formula ($n=5$) are heated with 100 parts (1 mol) of succinic acid anhydride for 6 hours to 180° C. Residual amounts of water are then removed by applying a vacuum of about 20 torr. A clear condensate is obtained which is solid at room temperature, has a molecular weight of about 2,000 and an acid number of about 3. A 40% solution of this product in xylene is mixed with a commercial 55% solution of a melamine-formaldehyde condensate in a xylene-butanol mixture (1:1) (Maprenal TTX of Cassella), the resulting ratio in the binding agent of polyester to melamine resin being 80:20. The varnish is pigmented with $TiO_2$ (ratio of binder:pigment=1:0.6), and 0.5% by weight of p-toluenesulfonic acid (based on the binder) is added.

For experimental purposes, the resultant enamel is applied to metal test sheets and cured. Hardness, elasticity, and impact depression of the resulting coatings are then measured (see Table 1).

EXAMPLE 3

Under a nitrogen purge stream, 1,988 parts (2 mols) of a carbonate-containing dihydroxy compound of the above general formula ($n=5$) are heated with 230 parts (1 mol) of decanedicarboxylic acid for 6 hours to 180° C. Residual amounts of water are then removed by applying a vacuum of about 20 torr. A clear condensate is obtained which is solid at room temperature, has a molecular weight of about 2,200 and an acid number of about 3. A 40% solution of this product in xylene is mixed with a commercial solution (55%) of a melamine-formaldehyde condensate in a xylene-butanol mixture (1:1) (Maprenal TTX of Cassella), so that the resulting ratio of polyester to melamine resin in the binder is 80:20. The varnish is pigmented with $TiO_2$ (ratio of binder:pigment=1:0.6), and 0.5% by weight of p-toluenesulfonic acid (based on the binder) is added.

For testing purposes, the enamel is spread on metal test sheets and cured. Hardness, elasticity, and impact depression of the resulting coatings are then measured (see Table 1).

EXAMPLE 4

Under a nitrogen purge stream, 1,988 parts (2 mols) of a carbonate-containing dihydroxy compound of the above general formula ($n=5$) are heated with 166 parts (1 mol) of isophthalic acid for 6 hours to 180° C. Residual amounts of water are then removed by applying a vacuum of about 20 torr. A clear condensate is obtained, solid at room temperature, having a molecular weight of about 2,000 and an acid number of about 3. A 40% solution of this product in xylene is mixed with a commerical 55% solution of a melamine-formaldehyde condensate in a xylene-butanol mixture (1:1) (Maprenal TTX of Cassella), so that the ratio of polyester to melamine resin in the binder is 80:20. The varnish is pigmented with $TiO_2$ (ratio of binder:pigment=1:0.6), and 0.5% by weight of p-toluene-sulfonic acid (based on the binder) is added.

For testing purposes, the enamel is spread on metal test sheets and cured; then, hardness, elasticity, and impact depression of the resulting coatings are measured (see Table 1).

EXAMPLE 5

Under a nitrogen purge stream, 3,688 parts (2 mols) of a carbonate-containing dihydroxy compound of the above general formula ($n=10$) are heated with 100 parts (1 mol) of succinic acid anhydride for 6 hours to 180° C. Residual amounts of water are then removed by the application of a vacuum of about 20 torr. A clear condensate is obtained, solid at room temperature and having a molecular weight of about 3,800 and an acid number of about 3. A 40% solution of this product in xylene is mixed with a commercially available 55% solution of a melamine-formaldehyde condensate in a xylene-butanol mixture (1:1) (Maprenal TTX of Cassella), to yield a ratio of polyester to melamine resin in the binder of 80:20. The varnish is pigmented with $TiO_2$ (ratio of binder:pigment=1:0.6), and 0.5% by weight of p-toluene-sulfonic acid (based on the binder) is added.

For testing purposes, the enamel is spread onto metal test sheets and cured; then, hardness, elasticity, and impact depression of the resulting coatings are measured (see Table 1).

EXAMPLE 6

Under a nitrogen purge stream, 4,028 parts (2 mols) of a carbonate-containing dihydroxy compound of the above general formula ($n=13$) are heated with 100 parts (1 mol) of succinic acid anhydride for 6 hours at 180° C. Residual amounts of water are then removed by applying a vacuum of about 20 torr. A clear condensate is obtained, solid at room temperature and having a molecular weight of about 4,100 and an acid number of about 3. A 40% solution of this product in xylene is mixed with a commercial 55% solution of a melamine-formaldehyde condensate in a xylene-butanol mixture (1:1) (Maprenal TTX of Cassella), to yield a ratio of polyester to melamine resin in the binder of 80:20. The varnish is pigmented with $TiO_2$ (ratio of binder:pigment=1:0.6), and 0.5% by weight of p-toluenesulfonic acid (based on the binder) is added.

For testing purposes, the enamel is spread onto metal test sheets and cured; then, hardness, elasticity, and impact depression of the resulting coatings are measured (see Table 1).

EXAMPLE 7

Under a nitrogen purge stream, 1,452 parts (3 mols) of a carbonate-containing dihydroxy compound of the above general formula ($n=2$) are heated with 200 parts (2 mols) of succinic acid anhydride for 6 hours to 180° C. Residual quantities of water are then removed by applying a vacuum of about 20 torr. A clear condensate is obtained, solid at room temperature and having a molecular weight of about 1,600 and an acid number of about 3. A 40% solution of this product in xylene is mixed with a commercial 55% solution of a melamine-formaldehyde condensate in a xylene-butanol mixture (1:1) (Maprenal TTX of Cassella), to yield a ratio of polyester to melamine resin in the binder of 80:20. The varnish is pigmented with $TiO_2$ (ratio of binder:pigment=1:0.6), and 0.5% by weight of p-toluenesulfonic acid (based on the binder) is added.

For testing purposes, the enamel is spread on test metal sheets and cured; then, hardness, elasticity, and impact depression of the resulting coatings are measured (see Table 1).

EXAMPLE 8

1,936 parts (4 mols) of a carbonate-containing dihydroxy compound of the above general formula ($n=2$) are heated with 300 parts (3 mols) of succinic acid anhydride for 6 hours to 180° C., while a nitrogen stream is conducted through the reaction mixture. Residual amounts of water are then removed by applying a vacuum of about 20 torr. A clear condensate is obtained, solid at room temperature, having a molecular weight of about 2,200 and an acid number of about 3. A 40% solution of this product in xylene is mixed with a commercial 55% solution of a melamine-formaldehyde condensate in a xylene-butanol mixture (1:1) (Maprenal TTX of Cassella), to yield a ratio of polyester to melamine resin in the binder of 80:20. The varnish is pigmented with $TiO_2$ (ratio of binder: pigment=1:0.6), and 0.5% by weight of p-toluene-sulfonic acid (based on the binder) is added.

For test purposes, the enamel is spread onto test metal sheets and cured; then, hardness, elasticity, and impact depression of the resulting coatings are measured (see Table 1).

EXAMPLE 9

2,420 parts (5 mols) of a carbonate-containing dihydroxy compound of the above general formula ($n=2$) are heated with 400 parts (4 mols) of succinic acid anhydride for 6 hours to 180° C., while a nitrogen stream is passed therethrough. Residual amounts of water are then removed by applying a vacuum of about 20 torr. A clear condensate is obtained, solid at room temperature and having a molecular weight of about 2,800 and an acid number of about 3. A 40% solution of this product in xylene is mixed with a commercial 55% solution of a melamine-formaldehyde condensate in a xylene-butanol mixture (1:1) (Marprenal TTX of Cassella), to yield a ratio of polyester to melamine resin in the binder of 80:20. The varnish is pigmented with $TiO_2$ (ratio of binder:pigment=1:0.6), and 0.5% by weight of p-toluenesulfonic acid (based on the binder) is added.

For testing purposes, the enamel is spread onto test metal sheets and cured; then, hardness, elasticity, and depression of impact of the resulting coatings are measured (see Table 1).

EXAMPLE 10

1,884 parts (6 mols) of a carbonate-containing dihydroxy compound of the above general formula ($n=1$) are heated with 500 parts (5 mols) of succinic acid anhydride for 6 hours to 180° C., while a nitrogen stream is passed therethrough. Residual amounts of water are then removed by applying a vacuum of about 20 torr. A clear condensate is obtained, solid at room temperature, and having a molecular weight of about 2,300 and an acid number of about 3. A 40% solution of this product in xylene is mixed with a commercial 55% solution of a melamine-formaldehyde condensate in a xylene-butanol mixture (1:1) (Maprenal TTX of Cassella), to yield a ratio of polyester to melamine resin in the binder of 80:20. The varnish is pignmented with $TiO_2$ (ratio of binder:pigment=1:0.6), and 0.5% by weight of p-toluenesulfonic acid (based on the binder) is added.

For testing purposes, the enamel is spread onto test metal sheets and cured; then, hardness, elasticity, and impact depression of the resulting coatings are measured (see Table 1).

EXAMPLE 11

1,988 parts (2 mols) of a carbonate-containing dihydroxy compound of the above general formula ($n=5$) are heated with 116 parts (1 mol) of fumaric acid for 6 hours to 180° C., while a nitrogen stream is passed therethrough. Residual quantities of water are removed by applying a vacuum of about 20 torr. A clear condensate is produced, solid at room temperature and having a molecular weight of about 2,000 and an acid number of about 3. A 40% solution of this product in xylene is mixed with a commercial 55% solution of a melamine-formaldehyde condensate in a xylene-butanol mixture (1:1) (Maprenal TTX of Cassella), to yield a ratio of polyester to melamine resin in the binder of 70:30. The varnish is pigmented with $TiO_2$ (ratio of binder:pigment= 1:06), and 0.5% by weight of p-toluenesulfonic acid (based on the binder) is added.

For testing purposes, the enamel is spread onto test metal sheets and cured; then, hardness, elasticity, and impact depression of the resulting coatings are measured (see Table 1).

For testing the chemical resistance, the coating is placed in a 10% sodium hydroxide solution for 8 hours at 90–95° C., and no visible damage was detected. Likewise, no damage occurred when the coating was subjected to 10% hydrochloric acid at room temperature.

EXAMPLE 12

1,452 parts (3 mols) of a carbonate-containing dihydroxy compound of the above general formula ($n=2$) are heated with 200 parts (2 mols) of succinic acid anhydride for 6 hours to 180° C., while a nitrogen stream is passed therethrough. Residual amounts of water are then removed by applying a vacuum of about 20 torr. A clear condensate is obtained, solid at room temperature and having a molecular weight of about 1,600 and an acid number of about 3. A 40% solution of this product in xylene is mixed with a commercial 55% solution of a melamine-formaldehyde condensate in a xylene-butanol mixture (1:1) (Maprenal TTX of Cassella) and a commercial 62% solution of a benzoguanamine-formaldehyde condensate in butanol (Maprenal HM of Cassella), to yield a binder ratio of polyester to melamine resin to benzoguanamine resin of 70:15:15. The varnish is pigmented with $TiO_2$ (ratio of binder:pigment=1:0.6), and 0.5% by weight of p-toluene-sulfonic acid (based on the binder) is added.

For testing, the enamel is spread onto test metal sheets and cured; then, hardness, elasticity, and impact depression of the resulting coatings are measured (see Table 1).

The coatings exhibit a remarkable retention of elastic behavior and luster after being baked, as demonstrated by the following data:

| | 30 minutes at— | | |
|---|---|---|---|
| | 130° C. | 160° C. | 190° C. |
| Depression according to DIN 53156 (mm.) | 7.7 | 7.2 | 5.2 |
| Impact cupping (mm.) | 5 | 5 | 3 |
| Luster in accordance with Lange | >100 | >100 | >100 |
| Hardness according to DIN 53157 (sec.) | 132 | 148 | 151 |

EXAMPLE 13

The clear varnish produced as in Example 12 is pigmented with 120 parts by weight of titanium dioxide. For testing. the resulting enamel is spread onto test metal sheets and cured for 30 minutes at 130° C.; then, hardness, elasticity, and impact cupping of the coatings are measured (see Table 1). The coatings exhibit a luster (according to Lange) of 100%.

EXAMPLE 14

A 40% solution of the polycarbonate ester produced as set forth in Example 7, in xylene, is mixed with a commercial 65% solution of a urea-formaldehyde condensate in butanol (Plastopal EBS 200 of Badische Anilinund Soda-Fabrik A. G.), to yield a binder ratio of polyester to urea resin of 70:30. The varnish is pigmented with $TiO_2$ (ratio of binder:pigment=1:06), and 0.56% by weight of p-toluene-sulfonic acid (based on the binder) is added.

For testing, the resulting enamel is spread onto test metal sheets and cured; then, hardness, elasticity, and impact cupping of the resulting coatings are measured (see Table 1).

EXAMPLE 15

A 40% solution of the polycarbonate ester, produced as in Example 7, in xylene, is mixed with a 40% solution of hexa-(methoxymethyl)-melamine in xylene, to yield a binder ratio of polyester to hexa-(methoxymethyl)-melamine of 80:20. The varnish is pigmented with $TiO_2$ (ratio of binder:pigment=1:0.6), and 0.5% by weight of p-toluenesulfonic acid (based on the binder) is added.

For test purposes, the resulting enamel is spread onto test metal sheets and cured; then, hardness, elasticity, and impact depression of the resulting coatings are measured (see Table 1).

COMPARATIVE EXAMPLE I 1,400 parts (9.0 mols) of adipic acid and 675 parts (10.9 mols) of ethylene glycol are heated slowly to 130–

140° C., while a nitrogen stream is conducted thereover. To prevent glycol from being simultaneously distilled with water, part of the distillate is refluxed to the column. During the course of several hours, the reaction mixture is heated to 200° C., then cooled to 150° C.; and the condensation is then continued under a vacuum of 200 torr and 200° C., this condensation step being terminated after 5-8 hours. The waxy polyester having a hydroxyl number of 54 and an average molecular weight of 2,000 is dissolved in a xylene-methyl-ethylketone mixture (1:1) to form a 50% solution thereof. Of this solution, 70 parts are mixed with 30 parts of a commercially available solution (diluted to a 50% concentration) of a melamine-formaldehyde condensate in a xylene-butanol mixture (1:1) (Maprenal TTX of Cassella). The clear varnish is pigmented with $TiO_2$ (ratio of binder:pigment=1:0.6), and 0.5% by weight of p-toluenesulfonic acid (based on the binder) is added.

For testing, the resultant enamel is spread onto metal test sheets and cured; then, hardness, elasticity, and impact depression of the resulting coatings are measured (see Table 1). The test results demonstrate that, although the coatings are elastic and impact-resistant, they are soft. In addition, the coatings are substantially completely devoid of luster.

COMPARATIVE EXAMPLE II

Under a nitrogen atmosphere, 316 parts of adipic acid (2.16 mols), 480 parts of phthalic acid anhydride (3.24 mols), and 374 parts of ethylene glycol (6.5 mols) are slowly heated to 160–200° C. The reaction is continued until 11.8 parts of distillate have passed over. In this connection, care must be taken that the temperature at the head of the column does not exceed 100° C. Thereafter, during the course of 6 hours, an additional 19 parts are distilled off under vacuum. The polyester, having an acid number of 3–4 and a hydroxyl number of 56, is dissolved in a xylene-methylethylketone mixture (1:1) to form a 50% solution. Of this solution, 70 parts are mixed with 30 parts of a commercial solution (diluted to 50%) of a melamine-formaldehyde condensate in a xylene-butanol mixture (1:1) (Maprenal TTX of Cassella). The clear varnish is pigmented with $TiO_2$ (ratio of binder:pigment=1:0.6); and 0.5% by weight of p-toluenesulfonic acid (based on the binder) is added.

For test purposes, the resultant enamel is spread on metal test sheets and cured; then, hardness, elasticity, and impact depression (cupping) of the resulting coatings are measured (see Table 1). The test results demonstrate that, although the coatings are elastic and impact resistant, they are soft, and like the coatings of Comparative Example I, the coatings of this example lack luster.

COMPARATIVE EXAMPLE III

Under a nitrogen atmosphere, 1,580 parts (5 mols) of the symmetrical, bis-(hydroxyethyl)-ether of bisphenol A are heated with 400 parts (4 mols) of succinic acid anhydride for 6 hours to 180° C. Residual amounts of water are then removed by applying a vacuum of about 20 torr. The thus-produced polyester, having an acid number of 5, is dissolved in a xylene-methylethylketone mixture (1:1) to form a 50% solution. Of this solution, 70 parts are mixed with 30 parts of a commercial solution (diluted to a content of 50%) of a melamine-formaldehyde condensate in a xylene-butanol mixture (1:1) (Maprenal TTX of Cassella). The clear varnish is pigmented with $TiO_2$ (ratio of binder:pigment=1:0.6), and 0.5% by weight of p-toluenesulfonic acid (based on the binder) is added.

For testing purposes, the resultant enamel is spread onto test metal sheets and cured; then, hardness, elasticity, and impact depression of the resulting coatings are measured (see Table 1). The test results demonstrate that the coatings, although hard, are neither elastic nor impact resistant. Furthermore, as in the last two examples, all luster is missing.

TABLE 1.—PROPERTIES OF THE COATINGS PRODUCED ACCORDING TO THE INVENTION AND THOSE PRODUCED FOR COMPARISON PURPOSES

| | Ester component | | | | Properties of the coatings | | | | | |
|---|---|---|---|---|---|---|---|---|---|---|
| | | | | | After curing at 130° C. for 30 minutes | | | After aging at 90° C. for 2.5 days | | |
| Example/ comparative example | $n$ in the dihydroxy compound | Dicarboxylic acid | Molar ratio of diol:dicarboxylic acid | Aminoplast | Hardness [1] (sec.) | Cupping [2] (mm.) | Impact depression (mm.) | Hardness [1] (sec.) | Depression [2] (mm.) | Impact depression (mm.) |
| 1 | 5 | Fumaric acid | 2:1 | Melamine-formaldehyde condensate. | 170 | 6 | 4 | 177 | 6 | 2 |
| 2 | 5 | Succinic acid | 2:1 | ___do___ | 175 | 7 | 5 | 190 | 6 | 5 |
| 3 | 5 | Decanedicarboxylic acid. | 2:1 | ___do___ | 150 | 7 | 5 | 160 | 7 | 4 |
| 4 | 5 | Isophthalic acid | 2:1 | ___do___ | 160 | 6 | 3 | 180 | 6 | 2 |
| 5 | 10 | Succinic acid | 2:1 | ___do___ | 150 | 9 | 5 | 155 | 8 | 5 |
| 6 | 13 | ___do___ | 2:1 | ___do___ | 165 | 9 | 5 | 165 | 8 | 5 |
| 7 | 2 | ___do___ | 3:2 | ___do___ | 174 | 6 | 5 | 172 | 6 | 4 |
| 8 | 2 | ___do___ | 4:3 | ___do___ | 130 | 8 | 5 | 130 | 6 | 5 |
| 9 | 2 | ___do___ | 5:4 | ___do___ | 140 | 8 | 5 | 160 | 7 | 5 |
| 10 | 1 | ___do___ | 6:5 | ___do___ | 130 | 8 | 5 | 100 | 8 | 5 |
| 11 | 5 | ___do___ | 2:1 | ___do___ | 179 | 8.7 | 5 | | | |
| 12 | 2 | ___do___ | 3:2 | Melamine-formaldehyde condensate plus benzoguanamine-formaldehyde condensate. | 132 | 7.7 | 5 | | | |
| 13 | 2 | ___do___ | 3:2 | ___do___ | | 3.3 | 1.5 | | | |
| 14 | 2 | ___do___ | 3:2 | Urea-formaldehyde condensate. | [3] 120 | [3] 6 | [3] 5 | | | |
| 15 | 2 | ___do___ | 3:2 | Hexa-(methoxymethyl)-melamine. | [3] 116 | [3] 8.8 | [3] 5 | | | |
| I | [4] | Adipic acid | | Melamine formaldehyde condensate. | 50 | 5 | 5 | 43 | 4 | 4 |
| II | [4] | Adipic acid plus phthalic acid. | | ___do___ | 17 | 9 | 5 | 20 | 7 | 4 |
| III | [5] | Succinic acid | | ___do___ | 148 | 0 | <1 | 150 | 0 | <1 |

[1] Pendulum hardness according to DIN 53 157.
[2] Erichsen depression according to DIN 53 156.
[3] Curing temperature: 160° C.
[4] Ethylene glycol.
[5] Bis-(hydroxyethylether) of bisphenol A.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. A coating composition comprising:
   (A) 10–40 parts by weight of an aminoplast; and
   (B) 90–60 parts by weight of a polyester of a dicarboxylic acid and a dihydroxy compound of the formula:

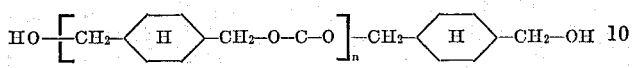

wherein $n$ represents an integer of 1 to 15 inclusive, the mol ratio of the dihydroxy compound to the acid being 2:1 to 1.2:1, and said aminoplast is a reaction product of an aldehyde with a compound having a plurality of amino or amido groups.

2. A coating composition as defined by claim 1 wherein the aminoplast is selected from the group consisting of melamine-formaldehyde condensate, urea-formaldehyde condensate and hexa-(methoxymethyl)-melamine.

3. A coating composition as defined by claim 1 wherein the dicarboxylic acid is selected from the group of fumaric acid, succinic acid, decanedicarboxylic acid and isophthalic acid.

4. A coating composition as defined by claim 2 wherein the dicarboxylic acid is selected from the group consisting of fumaric acid, succinic acid, decanedicarboxylic acid and isophthalic acid.

5. An article of manufacture comprising a metallic base having superimposed thereon a substantially uniform layer of a cured coating composition as defined by claim 1.

6. An article of manufacture comprising a metallic base having superimposed thereon a substantially uniform layer of a cured coating composition as defined by claim 4.

7. A coating composition as defined by claim 1 wherein $n$ is an integer of 1 through 10 inclusive.

8. A coating composition as defined by claim 4 wherein $n$ is an integer of 1 through 10 inclusive.

9. An article of manufacture as defined by claim 5 wherein $n$ is an integer of 1 through 10 inclusive.

10. An article of manufacture as defined by claim 6 wherein $n$ is an integer of 1 through 10 inclusive.

References Cited

UNITED STATES PATENTS

| 2,787,630 | 4/1957 | Katz et al. | 260—463 |
| 3,227,680 | 1/1966 | Tamblyn et al. | 260—75 |
| 3,245,963 | 4/1966 | Schramm et al. | 260—77.5D |
| 3,248,416 | 4/1966 | Stevens | 260—77.5D |
| 3,449,467 | 6/1969 | Wynstra | 260—850 |

FOREIGN PATENTS

| 690,043 | 7/1964 | Canada | 260—77.5D |
| 967,540 | 8/1964 | Great Britain | 260—463 |
| 693,956 | | Belgium. | |

JOHN C. BLEUTGE, Primary Examiner

U.S. Cl. X.R.

117—132, 161; 260— 33.4, 33.6, 39, 40, 75, 77.5, 463

UNITED STATES PATENT OFFICE
CERTIFICATE OF CORRECTION

Patent No. 3,544,656      Dated December 1, 1970

Inventor(s) Karl-Heinz Hornug et al.

It is certified that error appears in the above-identified patent and that said Letters Patent are hereby corrected as shown below:

Column 8, line 54, "0.56%" should read -- 0.5% --.
Column 11, line 23, "group of" should read -- group consisting of --.

Signed and sealed this 9th day of March 1971.

(SEAL)
Attest:

EDWARD M. FLETCHER, JR.
Attesting Officer

WILLIAM E. SCHUYLER, J
Commissioner of Patent

UNITED STATES PATENT OFFICE
CERTIFICATE OF CORRECTION

Patent No. 3,544,656            Dated   December 1, 1970

Inventor(s)   KARL-HEINZ HORNUNG et al.

It is certified that error appears in the above-identified patent and that said Letters Patent are hereby corrected as shown below:

Column 11, line 10, change the formula to

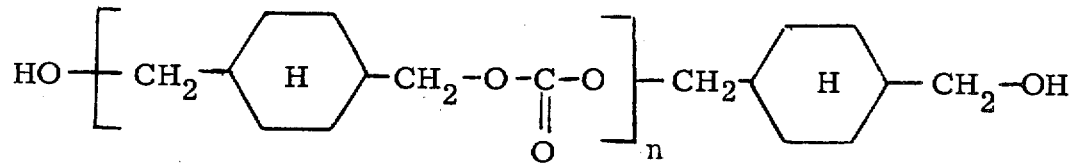

Signed and sealed this 28th day of September 1971.

(SEAL)
Attest:

EDWARD M. FLETCHER, JR.
Attesting Officer

ROBERT GOTTSCHALK
Acting Commissioner of Patents